United States Patent [19]
Olsen et al.

[11] B 3,930,188
[45] Dec. 30, 1975

[54] COMPLETELY INSULATED HIGH-VOLTAGE SWITCHING SYSTEM

[75] Inventors: Willi Olsen; Manfred Lieske, both of Berlin, Germany

[73] Assignee: Siemens Aktiengesellschaft, Munich, Germany

[22] Filed: Nov. 2, 1972

[21] Appl. No.: 303,011

[44] Published under the Trial Voluntary Protest Program on January 28, 1975 as document no. B 303,011.

[30] Foreign Application Priority Data
Nov. 12, 1971 Germany............................ 2157102

[52] U.S. Cl..................... 317/103; 200/148 R
[51] Int. Cl.$^2$......................................... H02B 1/20
[58] Field of Search ..... 200/148 R; 174/71 B, 72 R; 317/103, 26 R

[56] References Cited
UNITED STATES PATENTS

| | | | |
|---|---|---|---|
| 3,235,774 | 2/1966 | Frowein............................. | 317/103 |
| 3,405,325 | 10/1968 | Beuckner............................ | 317/103 |
| 3,527,911 | 9/1970 | Sharp.................................. | 317/103 |
| 3,578,927 | 5/1971 | Roth.................................. | 200/148 R |

FOREIGN PATENTS OR APPLICATIONS

| | | | |
|---|---|---|---|
| 1,230,115 | 12/1966 | Germany......................... | 200/148 R |
| 1,690,739 | 2/1971 | Germany | |

Primary Examiner—J. D. Miller
Assistant Examiner—Patrick R. Salce
Attorney, Agent, or Firm—Kenyon & Kenyon Reilly Carr & Chapin

[57] ABSTRACT

Fast-acting disconnect switches are arranged in the branches of a completely insulated high-voltage switching system. The bus bar of the system is fed by a power circuit breaker. The switches disconnect the branch circuits during the currentless interval caused by the operation of the power circuit breaker. The disconnect switches each have first and second connecting conductors at right angles to each other and are arranged in a configuration wherein the first connecting conductors face the power circuit breaker and together form the straight-line bus bar and the other connecting conductors for the branch lines facing away from the power circuit breaker are arranged in a single plane.

5 Claims, 2 Drawing Figures

COMPLETELY INSULATED HIGH-VOLTAGE SWITCHING SYSTEM

BACKGROUND OF THE INVENTION

1. Field of the Invention

This invention is concerned with a high-voltage switching system; more particularly with fast-acting disconnect switches in the branches of a completely insulated high-voltage switching system.

2. Description of the Prior Art

German Pat. No. 1,690,739, shows a completely insulated high-voltage switching system comprising a bus bar which is energized by a power circuit breaker. Connected to the bus bar are several branch lines. In the branch lines fast-acting disconnect switches are positioned for disconnecting the current during a current-free interval caused by a brief opening of the power circuit breaker. By utilizing these switches the power circuit breakers, which would otherwise be required in the individual branch lines are eliminated.

An object of this invention is to provide a particularly advantageous physical arrangement for installations of the type described above, in order to provide a more efficient utilization of space with a simple design.

SUMMARY OF THE INVENTION

According to this invention, the disconnect switches are provided with connecting conductors, disposed in the known manner at right angles to each other. More specifically, each disconnect switch is provided with first and second connecting conductors. The first connecting conductor of each disconnect switch is directed toward the breaker and is disposed to define a right angle with respect to the second conductor of the switch. The second connecting conductors are connected to corresponding ones of the branch lines. Disconnect switches of this type are shown, for example, in FIG. 1 of Deutsche Offenlegungsschrift No. 1,665,661. The switches are arranged so that the connecting conductors facing the power circuit breaker form the straight-line bus bar. The other connecting conductors, facing the branch line, can then preferably be arranged in the same direction, so that a uniform design is obtained. An additional bus bar is no longer required.

The disconnect switches preferably have gas-filled housings. The housings and the connecting conductors therein are connected with each other and face the power circuit breaker. The invention can, however, also be made with other than gaseous insulation means.

The leads facing away from the power circuit breaker of the disconnect switches may be located in one plane, whereby the disconnect switches of one group of consumers occupies the least possible space. The power circuit breaker can also be arranged in this plane, whereby in three-phase systems the three poles are situated side by side in parallel rows. A potential transformer associated with the bus bar is also preferably situated in the plane of the disconnect switches.

It has been found to be advantageous to associate one grounding switch with each connecting lead facing away from the power circuit breaker. This allows work to be performed at a disconnect switch without the danger of voltage being conducted back from the branch. Particularly advantageous in this case are secure, fast-acting grounding switches.

BRIEF DESCRIPTION OF THE DRAWINGS

To explain the invention in further detail, an example of the preferred embodiment is described in the following with reference to the FIGS. of which

DESCRIPTION OF THE PREFERRED EMBODIMENT

As described herein and as illustrated by the drawings, the system is shown as a single-pole installation. It, however, also can be erected according to the same design as a three-pole installation for a three-phase system.

Figure 1:
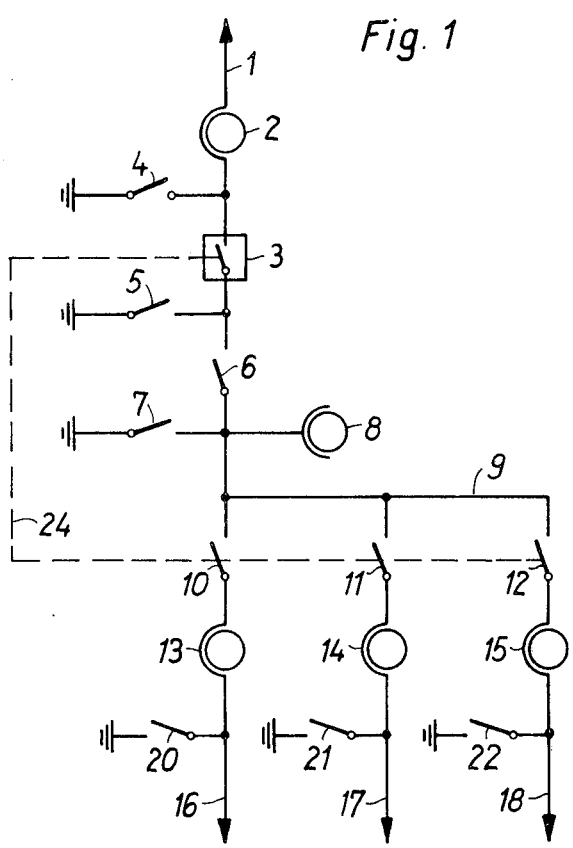
FIG. 1 illustrates the circuit diagram of a completely insulated high-voltage switching system.

In FIG. 1 cable 1 feeds the system and leads through a current transformer 2 to a power circuit breaker 3. In front of the power circuit breaker 3 a grounding switch 4 is provided. A similar grounding switch 5 is located after the power circuit breaker 3, so that the power circuit breaker 3 can be grounded for maintenance work.

Leading from the power circuit breaker 3 is a disconnect switch 6 which leads to a further grounding switch 7 and to a voltage transformer 8. The voltage transformer 8 is connected to a bus bar 9, which feeds three fast-acting disconnect switches 10, 11 and 12. These together with current transformers 13, 14 and 15 are connected to branch lines 16, 17 and 18, which can be grounded through grounding switches 20, 21 and 22.

The disconnect switches 10, 11 and 12 are coupled through a control line 24 with the power circuit breaker 3 in such a manner that they open without power to disconnect the branch lines during the currentless interval caused by a short opening of the power circuit breaker. The branch lines then can be connected independently of the power circuit breaker 3 by closing the disconnect switches.

Figure 2:
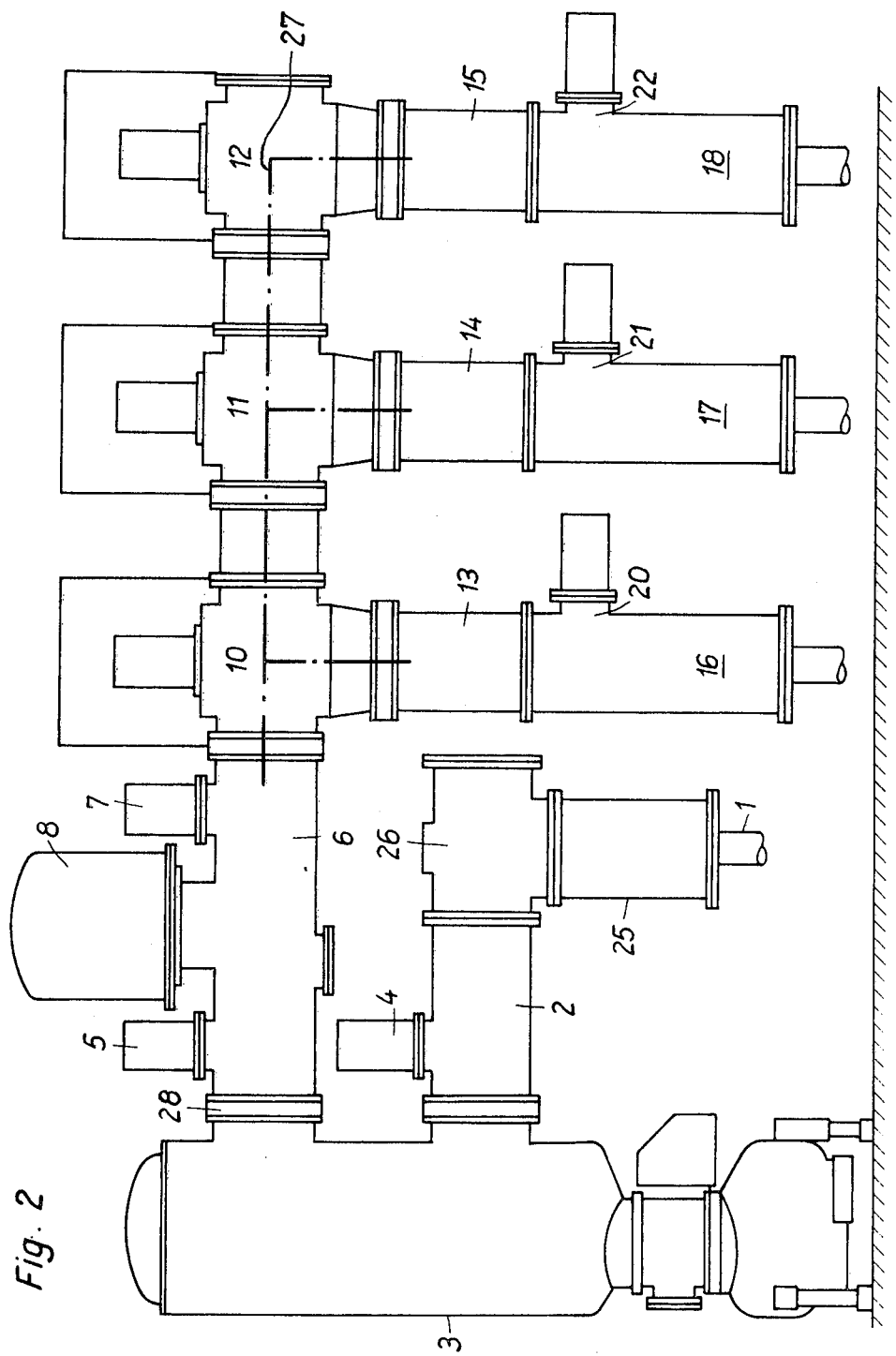
FIG. 2 illustrates a side elevational view of a switching system constructed according to this invention.

In FIG. 2 the components of the system, constructed with metal encapsulation and sulfur hexafluoride insulation, are designated with the same numerals as in FIG. 1.

The cable 1 leads to a cable terminal 25, at which the current transformer 2 with grounding switch 4 is mounted by an angle member 26. The power circuit breaker 3 is connected thereto and has a tank extending essentially in the vertical direction. At the upper terminal 28 the disconnect switch 6 is located with the grounding switches 5 and 7 adjacent the potential transformer 8.

Following after the disconnect switch 6, in the longitudinal direction, are the fast-acting disconnect switches 10, 11 and 12. These, together with the current transformers 13, 14 and 15 and the grounding switches 20, 21 and 22 belong to the branch lines 16, 17 and 18. The disconnect switches 10, 11 and 12 are constructed with connecting conductors disposed at right angles to each other. The connecting conductors of the disconnect switches facing the power circuit breaker form a straight-line bus bar 27, as indicated in FIG. 2 by a dot-dash line. At this bus bar, the stationary contacts of the disconnect switches are mounted.

The branches 16, 17 and 18 are located in a plane which is defined by the other connecting conductors of the disconnect switches 10, 11 and 12. The movable contacts of the disconnect switches 10, 11 and 12 and of the power circuit breaker 3 also move in this same plane. The tank of the power circuit breaker 3 is also oriented in this same plane as well as the cable termination 25, the disconnect switch 2, and the grounding switch 4 of the feed line. This results in a spacesaving design. Because of the orientation in the one plane, in which are situated the voltage transformer 8 and the current transformers 13, 14 and 15 of the branch lines as well as the secure, fast-acting grounding switches 20, 21 and 22 attached to the housings of the cable terminations, the arrangement shown resembles a relatively flat slab. For this reason, a very narrow area suffices for the installation, even in the case of a three-pole arrangement, where three such slabs are arranged in parallel planes side by side.

In the foregoing, the invention has been described in reference to specific exemplary embodiments. It will be evedent, however, that variations and modification, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. In a completely insulated high-voltage switching system having a bus-bar fed through a power circuit breaker, a plurality of disconnect switches for connecting a corresponding plurality of branch lines to the bus-bar and for disconnecting the same during a currentless interval caused by a short opening of the power circuit breaker, each of the disconnect switches having first and second connecting conductors, the second connecting conductor being connected to a corresponding one of the branch lines; the improvement comprising the arrangement wherein the first connecting conductor of each of the disconnect switches is directed toward the breaker and is disposed to define a right angle with respect to the second conductor thereof, the first connecting conductors of the disconnect switches being arranged in a straight line to conjointly define the bus-bar, said second connecting conductors being in one plane and the power circuit breaker forming a common plane with the disconnect switches.

2. The completely insulated high-voltage switching system of claim 1, said disconnect switches having gas-filled housings.

3. The completely insulated high-voltage switching system as claimed in claim 1, in which a voltage transformer connected with the bus bar lies in the same plane as the disconect switches.

4. The completely insulated high-voltage switching system as claimed in claim 3, in which each of the connecting conductors between the disconnect switches and the branch line has a grounding switch connected thereto.

5. The completely insulated high-voltage switching system as claimed in claim 4, in which the grounding switches are secure fast-acting switches.

* * * * *